Figure 4:
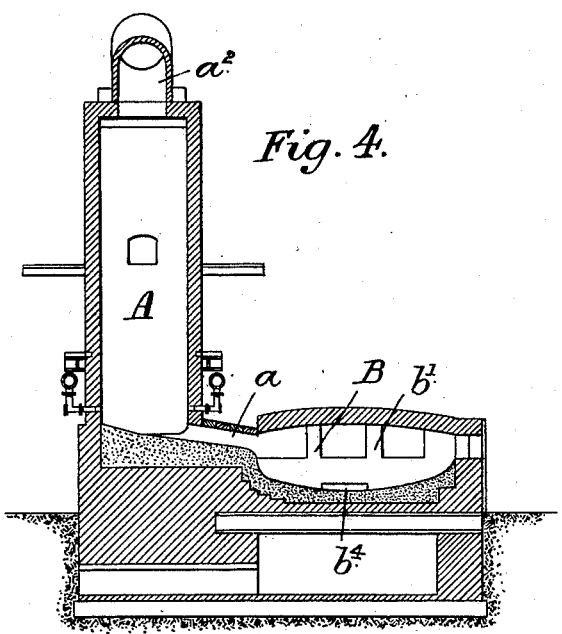

No. 711,173. Patented Oct. 14, 1902.
D. McKECHNIE.
PROCESS OF RECOVERING METALLIC COPPER FROM COPPER PRECIPITATE.
(Application filed June 15, 1901.)
(No Model.) 2 Sheets—Sheet 1.
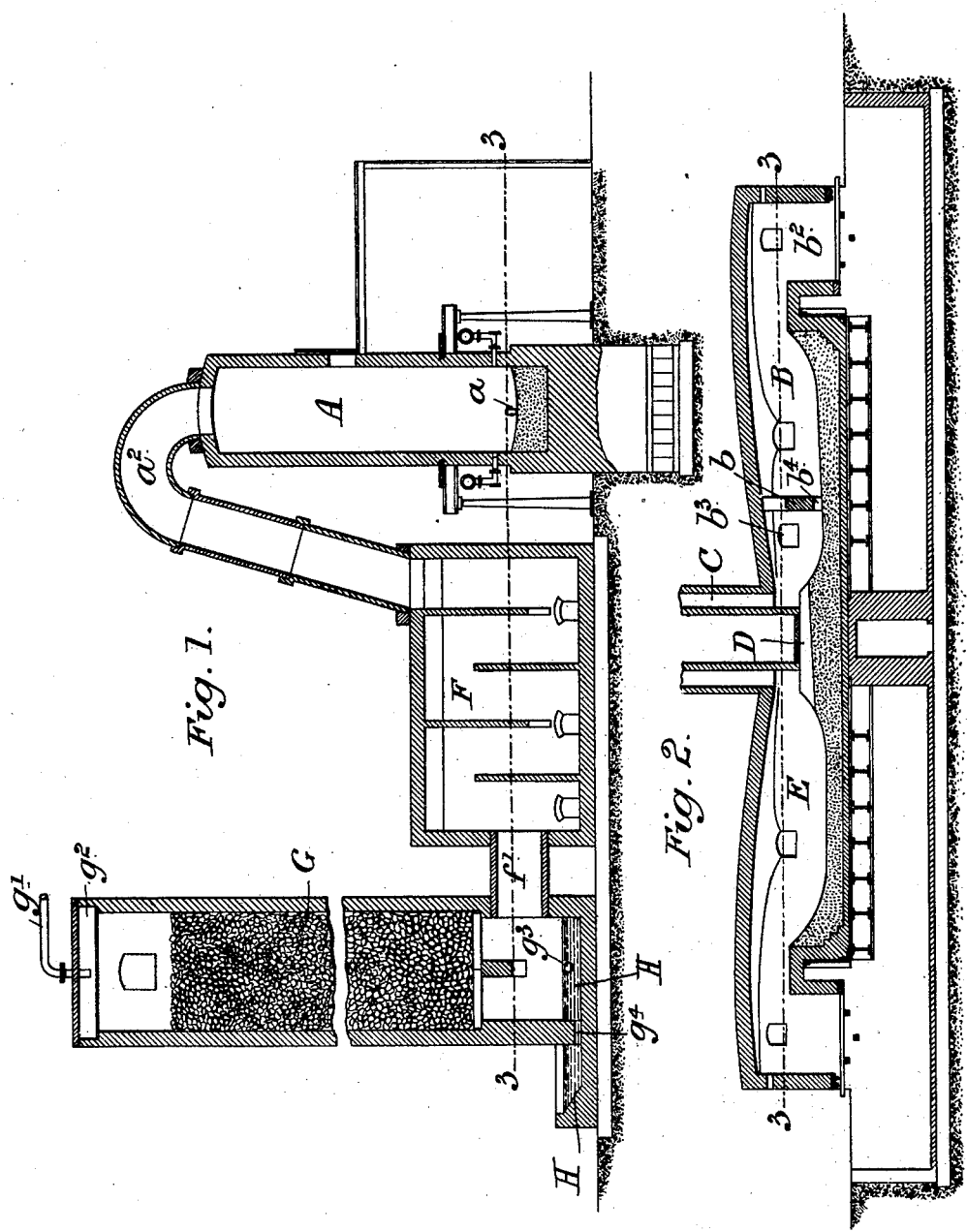

No. 711,173. Patented Oct. 14, 1902.
D. McKECHNIE.
PROCESS OF RECOVERING METALLIC COPPER FROM COPPER PRECIPITATE.
(Application filed June 15, 1901.)
(No Model.) 2 Sheets—Sheet 2.

Witnesses

Inventor:
Duncan McKechnie
by Philip Mauro
his attorney

UNITED STATES PATENT OFFICE.

DUNCAN McKECHNIE, OF LIVERPOOL, ENGLAND.

PROCESS OF RECOVERING METALLIC COPPER FROM COPPER PRECIPITATE.

SPECIFICATION forming part of Letters Patent No. 711,173, dated October 14, 1902.

Application filed June 15, 1901. Serial No. 64,679. (No specimens.)

*To all whom it may concern:*

Be it known that I, DUNCAN MCKECHNIE, director of the United Alkali Company, Limited, a subject of the King of Great Britain and Ireland, residing at 30 James street, Liverpool, in the county of Lancaster, England, have invented certain new and useful Improvements in Processes of Recovering Metallic Copper from Copper Precipitate; and I do hereby declare the following to be a full, clear, and exact description of the invention, such as will enable others skilled in the art to which it appertains to make and use the same.

The object of this invention is to provide a process for recovering metallic copper from copper precipitate in a more economical and direct manner than hitherto, the term "copper precipitate" being here used to designate any copper compound which has been precipitated from a solution by means of iron and composed mainly of copper, iron, alumina, carbon, and oxygen, with small quantities of lead, bismuth, arsenic, antimony, tin, nickel, cobalt, and silver.

According to this invention copper precipitate obtained from precipitating-vats is taken and molded into blocks, briquets, or the like, no binder being necessary, and then dried by any convenient means and then charged along with fuel—such as coke, for example—and preferably a little carbonate of lime as flux into a cupola or blast furnace, in which the charge is smelted and subjected to a reducing action, the molten copper and slag running into the hearth of a reverberatory furnace, in which the molten copper separates from the slag, which floats on the surface of the said copper. Near one end of and extending across the furnace is a curtain-wall, which dips into the molten bath, so as to allow molten copper to pass below the said wall, thus completely separating the metallic copper from the slag and allowing the fire-gases to escape to the chimney over the top of the said wall. After passing under the said wall the molten copper can either be tapped or ladled into ingot-molds as blister-copper or it can be tapped into another furnace for refining. As the gases from the cupola or blast furnace contain small quantities of copper in the form of copper-dust and volatilized copper salts, these gases are conducted into a dust-separating chamber to retain the copper-dust, and from thence the said gases are passed or drawn through a scrubber or through scrubbers packed with flints, bricks, or other suitable material, over which water is caused to flow, thus effecting the solution of any volatilized copper salts contained in the gases.

Figure 3:
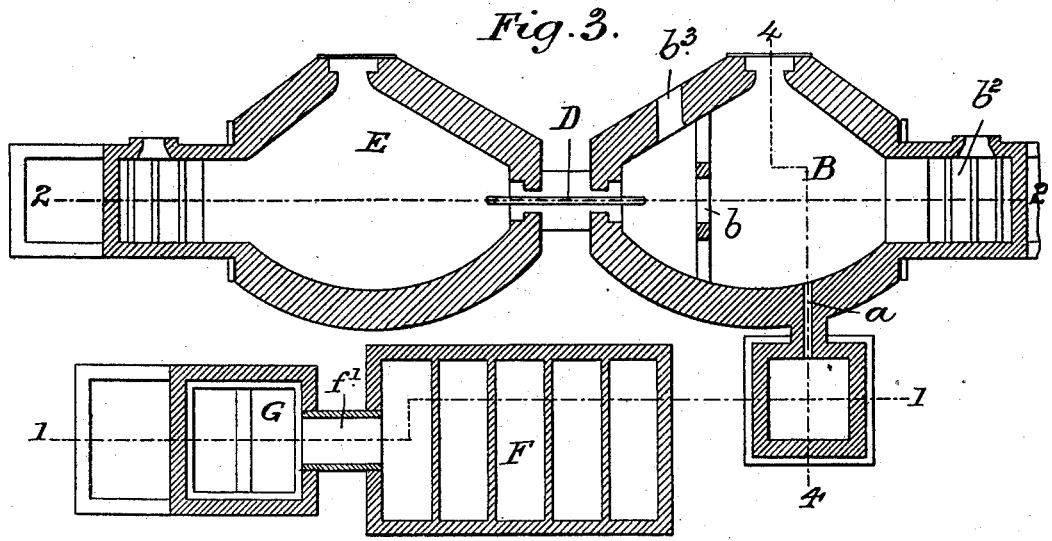

The accompanying drawings represent an arrangement of apparatus suited for the purposes of this invention, Figure 1 being a longitudinal section on the line 1 1, Fig. 3; Fig. 2, a longitudinal section on the line 2 2, Fig. 3; Fig. 3, a horizontal section on the line 3 3, Figs. 1 and 2; and Fig. 4 is a transverse vertical section on the line 4 4, Fig. 3.

A is a cupola or blast furnace in which the aforesaid charge of copper-precipitate bricks, briquets, or the like dried and mixed with fuel is smelted, the molten copper and slag running by the channel $a$ into the hearth of a reverberatory furnace B, near one end of which is a wall $b$, extending across the said furnace, the said wall having a passage $b^4$ between itself and the bottom of the furnace through which the molten copper passes, the slag being kept back by the said wall. The products of combustion from the fireplace $b^2$ pass over the top of the wall $b$ on their way to the chimney-flue C. D is an outlet from which the molten copper is either tapped from the said furnace B into a finishing or refining furnace E, or if blister-copper be required it can be ladled out from the furnace B through the door $b^3$ into molds.

The gases from the cupola or blast furnace A pass by the pipe $a^2$ into a dust-separating chamber F, in which copper-dust is retained, and thence the said gases pass by the pipe $f'$ through the scrubber G, containing flints, bricks, or the like material, over which water flows from the pipe $g'$ and distributer $g^2$, the said water taking up any volatilized copper salts from the said gases and passing off therewith by the outlet $g^3$ for the recovery of the said salts. This water may be repeatedly passed through the scrubber before treatment for the recovery of the salts contained therein. The base of the scrubber communicates by the passage $g^4$ with a trough H, through which any deposit in the base of the scrubber can be removed. Although one scrubber only is illustrated, two or more can be used, if desired.

By smelting in the way described the copper is much more efficiently and completely recovered than hitherto, a considerable saving of time is effected in carrying out the smelting operations, and the subsequent operations for the recovery of the copper in the slags are correspondingly reduced, resulting in a considerable saving of time and labor.

Having now particularly described and ascertained the nature of this invention and in what manner the same is to be performed, I declare that what I claim is—

1. The process of recovering metallic copper from copper precipitate, consisting in forming the precipitate into bricks, briquets or the like and drying the same, then smelting and subjecting the bricks to a reducing action in a cupola or blast furnace, drawing the material into a reverberatory furnace, maintaining the material in a molten condition, and separating the copper from the slag while the material is in the molten state.

2. The process of recovering metallic copper from copper precipitate, consisting in forming the precipitate into bricks, briquets or the like and drying the same, then smelting and subjecting the bricks to a reducing action in a cupola or blast furnace, drawing the material into a reverberatory furnace, maintaining the material in a molten condition, separating the copper from the slag while the material is in the molten state, and finally refining the copper.

In testimony whereof I affix my signature in presence of two witnesses.

DUNCAN McKECHNIE.

Witnesses:
WILLIAM LEE ELLISON,
GEORGE HERBERT ORMSON.